Patented Nov. 4, 1924.

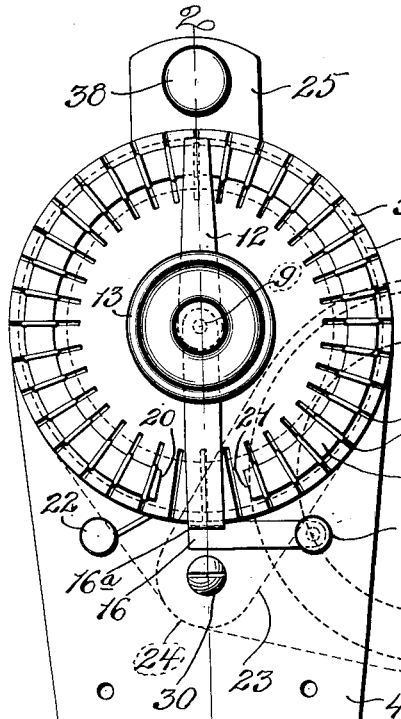

1,514,006

UNITED STATES PATENT OFFICE.

FRANCIS N. MERWIN, OF ST. LOUIS, MISSOURI.

VARIOCOUPLER.

Application filed February 21, 1923. Serial No. 620,324.

*To all whom it may concern:*

Be it known that FRANCIS N. MERWIN, a citizen of the United States of America, residing at St. Louis, State of Missouri, has invented certain new and useful Improvements in Variocouplers, of which the following is a specification.

The object of my device is to devise a vario-coupler which is simple and compact in structure, made of few and simple parts, one that lends itself readily to cheap multiple production and permits of tuning within a wide range in small compass. With these and other objects in view my invention has relation to certain novel features of construction and arrangement of parts as will be hereinafter more fully described, pointed out in the claims and illustrated in the drawings in which—

Fig. 1 is a front elevation of my device.

Fig. 2 is a longitudinal cross-section along the line 2—2 of Fig. 1 and

Fig. 3 is a fragmental sectional perspective of a portion of my device showing the winding of the primary coil.

Numeral 4 indicates a plate made of non-conducting material with its upper portion made semi-circular in form and having its sides taper toward the bottom. Numeral 5 designates a circular slotted disk also made of a non-conductor. The disk 5 and the plate 4 are secured in spaced relationship by the core 6. Through concentric holes through the plate 4 the core 6 and the disk 5 the hollow rivet 7 is pressed with its right face in Fig. 2 countersunk to be flush with the surface of the plate 4. The opposite end of the rivet is turned up as best shown at 8. The bolt 9 having the threads 10 passes through the hollow rivet 7 with its head flush with the external surface of the plate 4 and the threaded end projecting beyond the disk 5. A nut 11 is placed in threaded engagement with the threaded portion of the bolt 9 against the surface of the disk 5. A finger 12 equal in length approximately to the radius of the disk 5 through a hole near its one extremity is slipped over the threaded end of the bolt 9 against the nut 11 and the knob 13 is secured in threaded engagement to the threaded end in the bolt 9. By securing the knob 13 tight the finger 12 is held in frictional engagement between it and the nut 11 so that when the knob 13 is rotated the finger 12 will likewise be rotated with the bolt 9, the bolt 9 rotating in the hollow rivet 7. The slots 14 of the disk 5 extend to the periphery of the disk and radially inwardly extending to the periphery of the core 6. An annular space is formed between the plate 4 and the disk 5 over the periphery of the core 6. Hollow rivets secure the plate 4, the core 6 and the disk 5 against relative rotation. This space is utilized for the primary winding. An electrical connection is made between the bolt 9 and the binding post 15 by means of the metallic plate conductor 16 which is bent at right angles laterally and inwardly at 16ª. A hole at its loose end permits securing it to the binding post 15 and a hole in its opposite end permits the securing of it to the bolt 9 as best shown in Fig. 2.

A wire 17 is wound around the core 6 beginning with the dead end 18 for a certain number of turns or complete revolutions. For instance, I have illustrated in Fig. 3 fifteen complete revolutions or turns. Numeral 19 designates a bar circular in plan and rectangular in section having the two free ends 20 and 21. This bar 19 is placed on the disk 5 on the slots 14. The bar is of such size as to but partially cover the slots radially. The wire after having made the fifteen turns previously described is brought to the under side of the disk 5 at the inner end of the slot nearest the end of the bar 19 and is then wrapped over the bar 19 into the slot external to the bar 19 and then under the bar 19 to the space between the plate 4 and the disk 5 immediately over the turns of wire that have been wrapped as previously described for a predetermined number of complete turns and then is brought to the second slot from the end of the bar 19 as best shown in Fig. 3, passed over the bar 19 and under it and back and additional turns of wire wrapped on the turns previously described. This process is continued until wire has been wrapped around the bar 19 in the required number of slots and until the space between the plate 4 and the disk 5 external to the core 6 has been filled. The wire is not wrapped in layers but irregularly in order to prevent any induction effect. The wire 17 is insulated with the exception that the outer surface extending above the bar 19 is skinned, i. e. to say, the insulation is removed. By rotating the finger 12 it can be made to contact the different loops of wire on the external face of the bar 19. The end of the wire after having made all the necessary loops and turns is brought in electrical contact and fastened to the binding post 22. It will be seen that by a rotation of the finger 12 over the loops of wire in the slots 14 over the bar 19 that as many turns of wire wrapped on the core 6 can be brought in the circuit between the binding posts 15 and 22 as is desired. Numeral 23 designates a secondary plate substantially circular in section made of a non-conducting material and having the projection 24 formed at one side and the projection 25 diametrically opposite. Numeral 26 designates a secondary disk and numeral 27 a secondary core, the core being of lesser diameter than the disk. The secondary plate 23, the secondary core 27 and the secondary disk 26 are secured together by the hollow rivet 28. Around the secondary core 27 is wrapped a coil of wire 29 having two loose free ends which can be secured by any conventional means. Numeral 30 designates a bolt extending through a hole 31 in the plate 4, and having a washer 32 positioned thereon against the plate 4 and then passing through a hollow rivet 33 which is secured in the hole 34 in the secondary plate 23 and then having the coiled spring 35 wrapped around it and then the nut 36 in threaded engagement therewith. Numeral 37 indicates a lock nut in threaded engagement with the external end of the bolt 31. By this arrangement the secondary plate is placed in concentric spaced rotation relationship with the plate 4, said secondary plate rotating on the bolt 30. The spring 35 is compressed by the nut 36 against the secondary plate 23 which is, therefore, pressed against the washers 32. By this means the secondary plate 23 will remain in any position relative the plate 4 in which it is placed.

Numeral 38 designates a knob which is secured to the projection 25 of the secondary plate 23 for convenience in rotating manually the secondary plate 23.

It will be seen that by rotating the secondary plate 23 that it is brought in and out of the electrical field of the primary coil and that by varying this position the tuning is made more selective and precise. In other words, the tuning may be accomplished in two ways, one by the rotation of the finger 12 and by a rotation of the secondary plate 23.

What I claim and mean to secure by Letters Patent is:

1. A primary coil comprising a slotted disk and a plate, said disk and plate secured together by a core, said disk having radial slots formed therein, a mutilated circular bar positioned over the slots in said disk, a coil of wire wrapped around said core for a definite number of turns having a dead end and the other end extending through one slot over said bar into said slot and under said bar in said slot and over said core for a definite number of turns, said winding continuing and proceeding in such manner until all the slots have wires embedded in them.

2. A primary coil comprising a slotted disk and a plate, said disk and plate secured together by a core, said disk having radial slots formed therein, a mutilated circular bar positioned over the slots in said disk, a coil of wire wrapped around said core for a definite number of turns having a dead end and the other end extending through one slot over said bar into said slot and under said bar in said slot and over said core for a definite number of turns, said winding continuing and proceeding in such manner until all the slots have wires embedded in them, a metallic finger rotatively secured to the center of said coil, having its free end in electrical contact with the loops of wire over said bar, binding posts secured to said plate, one end of said coil of wire secured electrically to one binding post, the other end secured to said metallic finger.

In testimony whereof I affix my signature.

FRANCIS N. MERWIN.